United States Patent [19]
Takahashi et al.

[11] Patent Number: 5,578,120
[45] Date of Patent: Nov. 26, 1996

[54] LASER BEAM ABSORBING RESIN COMPOSITION, COLORING MATERIAL THEREFOR AND LASER BEAN MARKING METHOD

[75] Inventors: Jun Takahashi, Soka; Masaaki Toyoda, Kitakatsushika-gun; Akira Yasuda, Soka; Hideo Ochi, Misato, all of Japan

[73] Assignee: Somar Corporation, Japan

[21] Appl. No.: 601,833

[22] Filed: Feb. 15, 1996

Related U.S. Application Data

[60] Continuation of Ser. No. 381,069, Jan. 31, 1995, abandoned, which is a division of Ser. No. 231,406, Apr. 22, 1994, Pat. No. 5,422,383.

[30] Foreign Application Priority Data

Apr. 22, 1993 [JP] Japan ..................... 5-118953

[51] Int. Cl.$^6$ ................. C09C 1/36; C09C 1/02; C04B 14/02; C08K 3/00
[52] U.S. Cl. .......... 106/438; 106/401; 106/446; 106/450; 106/467; 106/470; 106/482; 106/483; 252/501.1; 252/520

[58] Field of Search .................. 106/401, 446, 106/450, 467, 470, 482, 483; 252/501.1, 520

[56] References Cited

FOREIGN PATENT DOCUMENTS

| 2678630 | 1/1993 | France | 106/446 |
| 0057681 | 3/1988 | Japan | 106/467 |

*Primary Examiner*—Peter A. Szekely
*Attorney, Agent, or Firm*—Lorusso & Loud

[57] ABSTRACT

A laser beam absorbing resin composition is disclosed which includes 100 parts by weight of a resin, and 1–100 parts by weight of composite particles having an average particle diameter of 0.1–50 μm and each including a particulate, laser beam absorbing inorganic substance, and a colorant physically bonded directly to the inorganic substance and capable of discoloring upon being heated at a temperature of 250° C. or more, the weight ratio of the colorant to the inorganic substance being in the range of 1:99 to 50:50. By irradiating a shaped, hardened body of the above composition with a laser beam, the colorant is thermally decomposed, so that the color of the irradiated surface is changed and becomes discriminative from that of non-irradiated surface.

3 Claims, No Drawings

LASER BEAM ABSORBING RESIN COMPOSITION, COLORING MATERIAL THEREFOR AND LASER BEAN MARKING METHOD

This application is a continuation of application Ser. No. 08/381069, filed Jan. 31, 1995, now abandoned, which is a division of U.S. Ser. No. 08/231,406, filed Apr. 22, 1994, now U.S. Pat. No. 5,422,383.

BACKGROUND OF THE INVENTION

This invention relates to a resin composition affording a hardened surface on which a clear mark, sign, letter or the like pattern can be marked with a laser beam. The present invention is also directed to a coloring material for use in preparing the above composition and to a laser beam marking method.

There is a known marking method in which a laser beam is irradiated on a surface of a shaped body containing a laser marking material, so that the irradiated portions are colored or discolored to form a desired, discriminative pattern on the surface of the shaped body. Such a laser marking material, e.g. a lead compound, is mixed in a resin matrix material and the resulting composition is shaped into a desired form. The known composition, however, has a problem because a clear, high contrast pattern is not obtainable even if the irradiation is sufficiently carried out.

To cope with this problem, JP-A-4-28758 and JP-A-4-183743 propose a laser beam absorbing resin composition including a colorant capable of discoloring upon being irradiated with a laser beam, a laser bean absorbing substance selected from calcium pyrophosphate, triphenyl phosphine, calcium hexafluorosilicate and zirconium silicate, and an epoxy resin. Because of the presence of the laser beam absorbing substance, the absorption of the laser beam is enhanced so that the coloring reaction of the colorant is accelerated. The known technique is, however, still unsatisfactory in forming a clear, high contrast pattern.

SUMMARY OF THE INVENTION

It is, therefore, the prime object of the present invention to provide a laser beam absorbing resin composition which can give a shaped body whose surface affords a clear, high contrast pattern by irradiation with a laser beam.

Another object of the present invention is to provide a coloring material useful for forming the above composition.

It is a further object of the present invention to provide a method for forming desired letters or patterns on a surface of a shaped body using a laser beam.

In accomplishing the foregoing objects, there is provided in accordance with the present invention a laser beam absorbing resin composition, comprising 100 parts by weight of a laser beam absorbing resin composition, comprising 100 parts by weight of a resin, and 1–100 parts by weight of composite particles having an average particle diameter of 0.1–50 μm and each including a particulate, laser beam absorbing inorganic substance, and a colorant physically bonded substantially directly to said inorganic substance and capable of discoloring upon being heated at a temperature of 250° C. or more, the weight ratio of said colorant to said inorganic substance being in the range of 1:99 to 50:50.

In a further aspect, the present invention provides a coloring material comprising composite particles which have an average particle diameter of 0.1–50 μm and each of which is composed of (a) a particulate, laser beam absorbing inorganic substance selected from the group consisting of cordierite, zeolite, zirconium silicate and calcium silicate and (b) a colorant physically bonded substantially directly to said inorganic substance and capable of discoloring upon being heated at a temperature of 250° C. or more, the weight ratio of said colorant to said inorganic substance being in the range of 1:99 to 50:50.

In a further aspect, the present invention provides a marking method comprising the steps of forming a shaped body of the above composition, hardening said shaped body to form a hardened body having a first color, and irradiating a surface of said hardened body with a laser beam to discolor said colorant, so that the irradiated surface has a second color discriminative from said first color.

Other objects, features and advantages of the present invention will become apparent from the detailed description of the invention to follow.

DETAILED DESCRIPTION OF THE PREFERRED EMBODIMENTS OF THE INVENTION

Laser beam absorbing, thermosetting resin composition according to the present invention contains a resin, and composite particles having an average particle diameter of 0.1–50 μm, preferably 0.5–30 μm, dispersed in the resin. Each of the composite particles includes a particulate, laser beam absorbing inorganic substance (herein after referred to as LB absorber), and a colorant physically bonded substantially directly to the LB absorber and capable of discoloring upon being heated at a temperature of 250° C. or more. The weight ratio of the colorant to the LB absorber should be in the range of 1:99 to 50:50, preferably 5:95 to 40:60. The shape of the composite particles is not specifically limited and may be spherical or any other forms.

Any inorganic substance may be used as the LB absorber as long as it can absorb a laser beam and can emanate a heat upon absorption of the laser beam without changing the color thereof. Illustrative of suitable LB absorbers are cordierite, zeolite, zirconium silicate and calcium silicate.

Cordierite is a mineral expressed by the formula: $2MgO \cdot 2Al_2O_3 \cdot 5SiO_2$. Natural cordierite which generally contains water and impurity metals such as Fe substituted for part of Mg may be used for the purpose of the present invention. High purity synthetic cordierite obtained from talc-alumina-kaolin is preferably used. Both natural and synthetic zeolite may be suitably used in the present invention. Examples of suitable zeolite include silicalite, crystalline aluminosilicate, crystalline aluminometalosilicate (e.g. aluminogallosilicate or aluminoborosilicate), faujasite and mordenite. Physical properties, such as pore characteristics, of zeolite are not specifically limited. Generally, zeolite having a pore diameter of at least 2 A (angstrom), preferably 2–10 A, is used. The LB absorber generally has an average particle diameter of 0.1–50 μm, preferably 0.5–30 μm.

A colorant capable of being discolored upon being irradiated with a laser beam is composited with the LB absorber. A substance which undergoes a chemical change (generally thermal decomposition and/or oxidation) and discolors when heated at a temperature of 250° C. or more, preferably 250°–2,000° C., is suitably used as the colorant. The term "discolor" used herein is intended to refer a phenomenon which is caused by irradiation of a laser beam and by which a surface of the laser beam absorbing resin composition irradiated with the laser beam is visually discriminative from non-irradiated surfaces. Thus, the colorant may be, for example, (a) a substance which has a first color (such as white, black or blue) at room temperature but shows a second color different from the first color upon laser beam irradiation and (b) a substance which has a color (such as white, black or blue) at room temperature but becomes colorless upon laser beam irradiation. The colorant generally has an average particle diameter of 0.01–10 μm, preferably 0.02–5 μm.

Examples of the colorant include ferric hydroxide, cuprous oxide, stannous oxide (IV), niobium oxide (V), chromium oxide (III), tungsten oxide (VI), copper hydroxide, copper gluconate, copper carbonate, silver acetate, nickel hydroxide, chromium hydroxide, indium hydroxide, nickel formate, copper oxalate, cobalt oxalate, aluminum acetylacetone, bismuth oxalate, silver acetate, titanium dioxide, metal titanates, basic nickel carbonate, basic copper carbonate, bismuth oxide (III), ammonium vanadate, red lead ($Pb_3O_4$), titanium yellow, basic lead phosphite, basic lead sulfite, basic lead phosphite sulfite, lead phosphite and lead sulfite. Semiconductor metal oxides such as disclosed in JP-A-49-82340 (e.g. zinc oxide semiconductors and titanium dioxide semiconductors) may also be used.

The composite particles may be prepared by the following methods. (1) Dry mixing method: The LB absorber and the colorant each in the form of powder or particle are mixed using a suitable mixer such as a ball mill, an automatic mortar, a hybridizer or a mechano-fusion system. During the mixing, the two kinds of the particles are contacted under pressure or at a high speed with each other so that the colorant particles deposit on or are bound to respective LB absorber particles. If desired, a liquid binder such as a silicone may be incorporated into the admixture of the LB absorber and the colorant to strengthen the bonding between therebetween. In this case, the amount of the binder is not greater than 10% by weight based on the weight of the LB absorber. (2) Wet mixing method: The LB absorber in the form of particles is mixed with a dispersion or solution of the colorant in a suitable solvent or a medium. After thorough mixing, the mixture is dried by evaporation of the liquid medium. If desired a binder may be incorporated into the solution or dispersion in an amount of not greater than 10% by weight based on the weight of the LB absorber. (3) Precipitation method: A solution of a precursor of the colorant is reacted in the presence of the LB absorber in the form of particles to precipitate the resulting colorant and to allow the precipitates to deposit on respective LB absorber particles. The reaction of the precursor may be, for example, neutralization, hydrolysis or decomposition. (4) coprecipitation method: The LB absorber and the colorant are coprecipitated and the resulting precipitates are dried and, if necessary, calcined and pulverized. (5) Sintering method: A mixture of the LB absorber and the colorant each in the form of powder or particles is sintered at such a temperature that the colorant is not discolored. The resulting sintered mass is then pulverized. The sintering is generally performed at a temperature of 1,100°–1,300° C. for 1–3 hours. Preferably the temperature is gradually increased to the sintering temperature at a rate of 5°–10° C./minute. This method is preferably adopted when the colorant used is not discolored at the sintering temperature. (6) Spray-drying method: The LB absorber in the form of particles is dispersed in a solvent solution of the colorant. The dispersion is sprayed in a hot atmosphere to rapidly evaporate the solvent so that the colorant deposit on the particles of the LB absorber.

The above composite particles are used as a coloring material to be mixed with the resin for the formation of the laser beam absorbing resin composition according to the present invention. The resin may be a thermoplastic resin or a thermosetting resin. Examples of suitable thermoplastic resins include polyolefin resins, polyvinyl chloride resins, styrene resins, polyamide resins, polyester resins, polycarbonate resins, acrylic resins, polyimide resins and polysulfone resins. Examples of suitable thermosetting resins include epoxy resins, phenol resins, bismaleimide resins, unsaturated polyester resins and urethane resins. A light sensitive resin such as of a photo decomposition type, a photo dimerization type, a photo polymerization type, or a photo curing type may also be used.

The composite particles are used in an amount of 1–100 parts by weight, preferably 2–50 parts by weight, more preferably 5–30 parts by weight, per 100 parts by weight of the resin.

The laser beam absorbing resin composition of this invention is in the form of powder or liquid (dispersion) and is used for forming a shaped body. The term shaped body used herein is intended to refer to a plate, a film, a pipe, a block, a coating or the like molded article or a composite article using these materials. Coatings, casings or packages for electric or electronic parts, such as condensers, resistors, diodes, IC, are typical examples of the shaped bodies. Various known methods may be used for the preparation of the shaped bodies, such as transfer molding, injection molding, press molding, casting, dipping, fluidized powder coating, electrostatic spray coating, spray coating and brush coating. The coating may be applied onto any desired surface such as of a metal, a ceramic, a plastic material, paper or wood.

Various additives may be incorporated into the laser beam absorbing resin composition. Examples of such additives include an auxiliary colorant which may be inert to a laser beam (e.g. ferric oxide) or may be discolored by irradiation with a laser beam; a filler which may be an inorganic or organic one; a thixotropic agent; a flame retardant such as hexabromobenzene, antimony trioxide or tetrabromobisphenol A; a coupling agent such as of a zirocoaluminum type, a silane type or a titanium type; a leveling agent such as an acrylic acid ester oligomer; a rubber such as carboxy-terminated butadiene acrylonitrile copolymer rubbers and nitrile-butadiene rubbers; a curing agent; a curing accelerator; a photopolykerization initiator; and a photopolymerization catalyst.

The auxiliary colorant is generally used in an amount of 0.01–100 parts by weight, preferably 0.1–50 parts by weight, per 100 parts by weight of the resin.

Examples of fillers include alumina, silica, magnesia, antimony trioxide, calcium carbonate, magnesium carbonate, mica, clay and sepiolite. The filler is generally used in an amount of 1–500 parts by weight, preferably 50–300 parts by weight, per 100 parts by weight of the resin.

Examples of thixotropic agents include (a) silica or alumina having an average particle size of 0.1 μm or less or (b) aluminum hydroxide, fibrous magnesium oxysulfate, fibrous silica, fibrous potassium titanate, flake mica or montmorillonite-organic base double salt (bentonite) having an average particle size of 3 μm or less. The thixotropic agent is generally used in an amount of 0.1–100 parts by weight, preferably 1–20 parts by weight, per 100 parts by weight of the resin.

The resin to be blended with the composite particles is preferably an epoxy resin such as a diglycidyl ether of bisphenol A, a diglycidyl ether of bisphenol F, a cresol novolak epoxy resin, a phenol novolak epoxy resin, an alkylphenol novolak epoxy resin, an alicyclic epoxy resin, a hydrogenated diglycidyl ether of bisphenol A, a hydrogenated diglycidyl ether of bisphenol AD, a diglycidyl ether of a polyol such as propylene glycol or pentaerythrytol, an epoxy resin obtained by reaction of an aliphatic or aromatic carboxylic acid with epichlorohydrin, an epoxy resin obtained by reaction of an aliphatic or aromatic amine with epichlorohydrin, a heterocyclic epoxy resin, a spiro-ring containing epoxy resin and a resin modified with an epoxy group. These epoxy resins may be used singly or as a mixture of two or more thereof. If desired the above epoxy resin may be used in conjunction with a thermoplastic resin.

As a curing agent for the epoxy resin, there may be used, for example, a carboxylic acid, an acid anhydride, an amine, a mercaptane, a polyamide, a boron compound, dicyandiamide or its derivative, a hydrazide, an imidazole compound, a phenol compound, a phenol novolak resin or an amineimide. The curing agent is generally used in an amount of 0.5–1.5 equivalents, preferably 0.7–1.2 equivalents, per one equivalent of epoxy groups of the epoxy resin.

The curing agent may be used in combination with a curing accelerator, if desired. Examples of curing accelerators include tertiary amines such as triethylamine, N,N-dimethylbenzylamine, 2,4,6-tris(dimethylaminomethyl)phenol and N,N-dimethylaniline; imidzole compounds such as 2-methylimidazole and 2-phenylimidazole; triazine salts, cyanoethyl salts and cyanoethyltrimellitic acid salts of imidazole compounds; amides such as dicyandiamide; peroxides; triphenylphosphine; amine adducts; and phenol novolak salt of DBU (1,8-diazabicyclo(5,4,0)undecene-7). The curing accelerator is used in an amount of 0.05–10 parts by weight, preferably 0.1–5 parts by weight per 100 parts by weight of the epoxy resin.

Desired marks or patterns such as bar codes or letters having a color clearly discriminative from the background can be marked on the surface of the shaped body formed from the laser beam absorbing resin composition with a laser beam. Suitable laser beam used for marking is that which has a wavelength in an infrared or near infrared radiation region. Carbon dioxide laser beam, helium-neon laser beam, argon laser beam and YAG (yttrium-aluminum-garnet) laser beam are illustrative of suitable laser beams. The use of carbon dioxide laser beam is particularly preferred. Commercially available laser beam generating devices may be suitably used. Such laser beam generating devices generally produces a laser beam with a radiation energy of 2–10 J/cm$^2$. The irradiation of laser beam is performed for a period of time sufficient to discolor the irradiated surface of the shaped body and is preferably less than $10^{-5}$ second.

More particularly, when a surface of a shaped body formed from the laser beam absorbing resin composition is irradiated with a laser beam, the irradiated portion only is heated to a high temperature to cause not only the thermal decomposition of the resin but also the discoloration of the colorant. The thermal decomposition of the resin generally results in the formation of gaseous products so that the resin disappears from the irradiated surfaces. When the laser beam discoloring colorant used is of the above-mentioned type (a) in which discoloration from a first color to a second color is caused by laser beam irradiation, the color of the irradiated surface generally turns from a first, mixed color of the first color and the other ingredients to a second, mixed color of the second color and the other ingredients. When the discoloring colorant is of the type (b) which becomes colorless upon being heated, the color of the laser bee-irradiated surface shows a mixed color of the ingredients other than that colorant.

Since the colorant is in contact with the LB absorber, the irradiation with the laser beam cause the colorant to be discolored with a high sensitivity so that clear, high density marks may be instantaneously formed on the irradiated surface. If desired, the composite particles composed of the LB absorber and the colorant may be used for incorporation into an inorganic paint such as a water glass composition. Namely, the composite particles of the present invention may be used with an inorganic binder to form inorganic molded bodies, such as ceramic bodies, whose surface can be marked with a laser beam.

The following examples will further illustrate the present invention. Parts are by weight.

In the present specification, the term "average particle diameter" is intended to refer to a Stokes diameter when the particles have a diameter of less than 1 μm and to an equivalent volume diameter when the particles have a diameter of 1 μm or more.

EXAMPLE 1

Preparation of Composite Particles by Dry-Mixing Method (Method A):

Each of the four colorants shown below was charged into a high speed jet impact-type mixer (Hybridizer NHS-1 manufactured by Nara Machinery Inc.) together with cordierite (SS-200 manufactured by Marusu Yuyaku Inc., average particle diameter: 10 μm, white LB absorber) and the contents were mixed for 5 minutes at a revolution speed of 8,000 rpm to obtain composite particles having an average particle diameter of 10 μm and a weight ratio of the colorant to the cordierite of 1:9.

Colorant:

1. Titanium dioxide ($TiO_2$), Tipaque R-830 manufactured by Ishihara Sangyo Inc., white pigment, average particle diameter: 0.255 μm, hereinafter referred to as Ti-W;

2. Titanium yellow (mixture of $TiO_2$, $NiO_2$ and $Sb_2O_3$, Tipaque TY-70 manufactured by Ishihara Sangyo Inc., yellow pigment, average particle diameter: 1.05 μm, hereinafter referred to as Ti-Y;

3. FeOOH, Mapicotan YP-100N manufactured by Tone Sangyo Inc., orange yellow pigment, average particle diameter: 0.2–1.0 μm, hereinafter referred to as Fe-O;

4. cupric oxalate, light blue, average particle diameter: 1.0 μm, hereinafter referred to as Cu-B.

Each of the thus obtained four kinds of composite particles (hereinafter referred to as CoA-Ti-W, CoA-Ti-Y, CoA-Fe-O and CoA-Cu-B) were press-molded into a tablet having a diameter of 16 mm and a thickness of 1.0 mm and the tablet was irradiated with a laser beam ($CO_2$ laser, energy 4J/cm$^2$) using a laser beam marking device (TEA Unimark 400-4J manufactured by Ushio Electric Co., Ltd. ) to obtain bar mark (line width: 2 mm). Irradiation was performed only once or repeated five times. The thus obtained marks were observed with native eyes to evaluate the visibility thereof on the basis of the following ratings:

A: very clear
B: clear
C: slightly unclear
D: unclear

The results are summarized in Table 1.

TABLE 1

| Colorant | Visibility Once | Visibility Five times | Color of Mark |
| --- | --- | --- | --- |
| Ti—W | C | A | black |
| Ti—Y | C | A | black |
| Fe—O | B | A | black |
| Cu—B | C | A | black |

Comparative Example 1

Example 1 was repeated in the same manner as described except that no cordierite was used. The results are shown in Table 2.

TABLE 2

| Colorant | Visibility Once | Visibility Five times |
| --- | --- | --- |
| Ti—W | C | C |
| Ti—Y | C | C |
| Fe—O | C | B-C |
| Cu—B | C | C |

EXAMPLE 2

Preparation of Laser Beam Absorbing Plate:

A thermoplastic resin shown below was blended with a quantity of respective one of the composite particles obtained in Example 1. The blend was mixed at a temperature sufficient to melt the resin and then molded into a plate having a width of 20 mm, a length of 50 mm and a thickness of 1 mm. Laser marking test was carried out in the same manner as described in Example 1. The results are summarized in Table 3. The color of the marks was black.

Thermoplastic Resin:

1. Polyethylene (hereinafter referred to as Resin-PE)
2. Polycarbonate (hereinafter referred to as Resin-PC)
3. Polystyrene (hereinafter referred to as Resin-PS)

TABLE 3

| Resin | Composite Particles Kind | Composite Particles Amount (parts*) | Visibility Once | Visibility Five times |
| --- | --- | --- | --- | --- |
| Resin-PE | CoA—Ti—W | 10 | C | B |
| Resin-PE | CoA—Ti—Y | 10 | C | B |
| Resin-PE | CoA—Fe—O | 2 | B | A |
| Resin-PE | CoA—Cu—B | 10 | C | B |
| Resin-PC | CoA—Ti—W | 10 | C | B |
| Resin-PC | CoA—Ti—Y | 10 | C | B |
| Resin-PC | CoA—Fe—O | 2 | B | A |
| Resin-PS | CoA—Ti—W | 10 | C | B |
| Resin-PS | CoA—Ti—Y | 10 | C | B |
| Resin-PS | CoA—Fe—O | 2 | B | A |

EXAMPLE 3

Preparation of Composite Particles by Sintering Method (Method B):

A colorant (4 g) shown in Table 4 and cordierite (36 g, the same as used in Example 1) were charged in a planetary ball mill (P-5 manufactured by Flitch Japan Inc.) together with 50 g of water and the contents were mixed for 1 hour. The resulting dispersion was filtered and the solids phase was dried and sintered at 1,300° C. for 1 hour. The sintered mass was then pulverized into particles having an average particle diameter of 15 μm.

Preparation of Laser Beam Absorbing Plate:

The thus obtained composite particles (CoB-Ti-W, CoB-Ti-Y and CoB-Nb-W, 10 parts) were each mixed with a resin (100 parts) shown in Table 4 and the resulting composition was molded into a plate in the same manner as that in Example 2. The plate was then irradiated with a laser beam marking in the same manner as that in Example 1 to give black marks whose visibility was shown in Table 4. For the purpose of comparison, the resin (100 parts), the colorant (1 part) and cordierite (9 parts) were simultaneously mixed and the resulting composition was formed into a plate in the same manner as that in Example 2. The laser marking on the comparative samples was white to gray and had visibility shown in Table 4.

Colorant:

5. Niobium (V) oxide, white colorant, average particle diameter: 1.68 μm, hereinafter referred to as Nb-W.

TABLE 4

| Experiment | 1* | 2 | 3* | 4 | 5* | 6 | 7 |
| --- | --- | --- | --- | --- | --- | --- | --- |
| Resin | | | | | | | |
| Resin-PC | 100 | 100 | 100 | 100 | 100 | 100 | |
| Resin-PE | | | | | | | 100 |
| Colorant | | | | | | | |
| Ti—W | 1 | | | | | | |
| Ti—Y | | | 1 | | | | |
| Nb—W | | | | | 1 | | |
| Cordierite | 9 | | 9 | | 9 | | |
| Composite | | | | | | | |
| CoB—Ti—W | | 10 | | | | | 10 |
| CoB—Ti—Y | | | | 10 | | | |
| CoB—Nb—W | | | | | | 10 | |
| Visibility | | | | | | | |
| Once | D | B | D | B | D | C | B |
| Five times | D | A | D | A | D | B | A |

*Comparative samples

EXAMPLE 4

Preparation of Composite Particles by Dry-Mixing Method (Method A):

Using the combination of a colorant and an LB absorber shown below, the following five composite particles (CoA-Ti-W, ZeA-Ti-W, ZrA-Ti-W, CaA-Ti-W and CoA-Nb-W) were prepared by the Method A shown in Example 1.
CoA-Ti-W: Ti-W and cordierite
ZeA-Ti-W: Ti-W and zeolite
ZrA-Ti-W: Ti-W and zirconium silicate
CaA-Ti-W: Ti-W and calcium silicate
CoA-Nb-W: Nb-W and cordierite
LB absorber:
 1. Cordierite (the same as used in Example 1)
 2. Zeolite: Zeolite 4A manufactured by Union Showa Inc. average particle diameter: 10 μm, white particles
 3. Zirconium silicate: Micropax manufactured by Hakusui Chemical Industries Inc., average particle diameter: 2.0 μm, white particles, hereinafter referred to as Zr-silicate 4. Calcium silicate: Niat 400 manufactured by Interpace Inc., average particle diameter: 6.0 μm, white particles, hereinafter referred to as Ca-silicate Preparation of Laser Beam Absorbing Plate:

The thus obtained composite particles were each mixed with a resin (100 parts) shown in Table 5 and the resulting composition was molded into a plate in the same manner as that in Example 2. The plate was then irradiated with a laser beam marking in the same manner as that in Example 1 to give grayish black or black marks whose visibility was shown in Table 5. For the purpose of comparison, the resin (100 parts), the colorant (1 part) and the LB absorber (9 parts) shown in Table 5 were simultaneously mixed and the resulting composition was formed into a plate in the same manner as that in Example 2. The laser marking on the comparative samples was white to gray and had visibility shown in Table 5.

were prepared by the Method B shown in Example 3.
CoB-Ti-W: Ti-W and cordierite
ZeB-Ti-W: Ti-W and zeolite
ZrB-Ti-W: Ti-W and Zr silicate
CaB-Ti-W: Ti-W and Ca silicate
CoB-Nb-W: Nb-W and cordierite Preparation of Laser Beam Absorbing Plate:

The thus obtained composite particles were each mixed with a resin (100 parts) shown in Table 6 and the resulting composition was molded into a plate in the same manner as that in Example 2. The plate was then irradiated with a laser beam marking in the same manner as that in Example 1 to give black marks whose visibility was shown in Table 6. For the purpose of comparison, the resin (100 parts), the colorant (1 part) and the LB absorber (9 parts) shown in Table 6 were simultaneously mixed and the resulting composition was formed into a plate in the same manner as that in Example 2. The laser marking on the comparative samples was white to gray and had visibility shown in Table 6.

TABLE 5

| Experiment | 1* | 2 | 3* | 4 | 5* | 6 | 7* | 8 | 9* | 10 | 11 |
|---|---|---|---|---|---|---|---|---|---|---|---|
| Resin | | | | | | | | | | | |
| Resin-PC | 100 | 100 | 100 | 100 | 100 | 100 | 100 | 100 | 100 | 100 | |
| Resin-PE | | | | | | | | | | | 100 |
| Colorant | | | | | | | | | | | |
| Ti—W | 1 | | 1 | | 1 | | 1 | | | | |
| Nb—W | | | | | | | | | 1 | | |
| LB absorber | | | | | | | | | | | |
| Cordierite | 9 | | | | | | | | 9 | | |
| Zeolite | | | 9 | | | | | | | | |
| Zr-silicate | | | | | 9 | | | | | | |
| Ca-silicate | | | | | | | 9 | | | | |
| Composite | | | | | | | | | | | |
| CoA—Ti—W | | 10 | | | | | | | | | 10 |
| ZeA—Ti—W | | | | 10 | | | | | | | |
| ZrA—Ti—W | | | | | | 10 | | | | | |
| CaA—Ti—W | | | | | | | | 10 | | | |
| CoA—Nb—W | | | | | | | | | | 10 | |
| Visibility | | | | | | | | | | | |
| Once | D | C | D | C | D | C | D | C | D | C | C |
| Five times | D | B | D | B | D | B | D | B | D | B | B |

*Comparative samples

EXAMPLE 5

Preparation of Composite Particles by Sintering Method (Method B):

Using the combination of a colorant and an LB absorber shown below, the following five composite particles (CoB-Ti-W, ZeB-Ti-W, ZrB-Ti-W, CaB-Ti-W and CoB-Nb-W)

TABLE 6

| Experiment | 1* | 2 | 3* | 4 | 5* | 6 | 7* | 8 | 9* | 10 | 11 |
|---|---|---|---|---|---|---|---|---|---|---|---|
| Resin | | | | | | | | | | | |
| Resin-PC | 100 | 100 | 100 | 100 | 100 | 100 | 100 | 100 | 100 | 100 | |
| Resin-PE | | | | | | | | | | | 100 |
| Colorant | | | | | | | | | | | |
| Ti—W | 1 | | 1 | | 1 | | 1 | | | | |

TABLE 6-continued

| Experiment | 1* | 2 | 3* | (continue) 4 | 5* | 6 | 7* | 8 | 9* | 10 | 11 |
|---|---|---|---|---|---|---|---|---|---|---|---|
| Nb—W | | | | | | | | | 1 | | |
| LB absorber | | | | | | | | | | | |
| Cordierite | 9 | | | | | | | | 9 | | |
| Zeolite | | 9 | | | | | | | | | |
| Zr-silicate | | | | 9 | | | | | | | |
| Ca-silicate | | | | | | 9 | | | | | |
| Composite | | | | | | | | | | | |
| CoB—Ti—W | | 10 | | | | | | | | | 10 |
| ZeB—Ti—W | | | | 10 | | | | | | | |
| ZrB—Ti—W | | | | | | 10 | | | | | |
| CaB—Ti—W | | | | | | | | 10 | | | |
| CoB—Nb—W | | | | | | | | | | 10 | |
| Visibility | | | | | | | | | | | |
| Once | D | B | D | C | D | B | D | C | D | C | B |
| Five times | D | A | D | B | D | A | D | B | D | B | A |

*Comparative samples

EXAMPLE 6

Preparation of Composite Particles by Precipitation Method (Method C):

Into a three-necked flask were charged 10 g of cordierite (the same as used in Example 1) and 100 ml of water and the mixture was heated to 100° C. With stirring, a solution of titanium sulfate (16.68 g) dissolved in 25.02 ml of water was poured dropwise into the flask. The resulting mixture was refluxed for 6 hours with stirring. The resulting precipitates were filtered and washed with water until the pH of the washed water became 6–7. The scanning electric microscope analysis revealed that the cordierite particles were each covered with titanium oxide. The precipitates thus obtained were then calcined at 800° C. to obtain composite particles CoC-Ti-W having an average particle diameter of 15 μm and a weight ratio of Ti-W to cordierite of 3:7.

Preparation of Composite Particles by Wet-Mixing Method Using Binder (Method D):

Into a planetary ball mill were charged 8 g of polyethylene glycol (weight average molecular weight: 6000), 10 g of water and 10 g of Ti-W (titanium dioxide). The contents were mixed and thereafter added with 300 g of water. Further mixing of the contents gave a first suspension. Polyethylene glycol (the same as above, 3 g) was dissolved in 1,500 ml of water, into which 190 g of cordierite (the same as used in Example 1) were mixed with stirring to obtain a second suspension. With stirring, the first suspension was added to the second suspension. The resulting mixture was filtered and the separated solids were dried to obtain composite particles CoD-Ti-W having an average particle diameter of 10 μm and a weight ratio of Ti-W to cordierite of 1:19. The scanning electric microscopic analysis revealed that titanium dioxide deposits on the surfaces of cordierite particles.

The thus obtained composite particles CoC-Ti-W and CoD-Ti-W as well as CoA-Ti-W (Example 1) and CoB-Ti-W (Example 3) were each formed into a disc in the same manner as that in Example 1. Laser marking was carried out in the same manner as that in Example 1 to give the results shown in Table 7.

TABLE 7

| Composite | Visibility Once | Five times | Color of Mark |
|---|---|---|---|
| CoA—Ti—W | C | A | black |
| CoB—Ti—W | B | A | black |
| CoC—Ti—W | B | A | black |
| CoD—Ti—W | C | B | gray-black |

EXAMPLE 7

Using the colorants and the LB absorbers shown in Table 8, various composite particles were prepared by the same dry-mixing method (Method A) shown in Example 1. Each composite was formed into a disc in the same manner as that in Example 1. Laser marking was carried out in the same manner as that in Example 1 to give the results shown in Table 8.

TABLE 8

| Composite No. | LB Absorber | Colorant | Visibility Once | Five times | Color of Mark |
|---|---|---|---|---|---|
| 1 | cordierite | Ti—W | C | A | black |
| 2 | cordierite | Ti—Y | C | A | black |
| 3 | cordierite | Fe—O | B | A | black |
| 4 | cordierite | Cu—B | C | A | black |
| 5 | Zr-silicate | Ti—W | C | B | black |
| 6 | Zr-silicate | Ti—Y | C | B | black |
| 7 | Zr-silicate | Fe—O | B | A | black |
| 8 | Zr-silicate | Cu—B | C | A | black |
| 9 | zeolite | Ti—W | C | B | black |
| 10 | zeolite | Ti—Y | C | B | black |
| 11 | zeolite | Fe—O | B | A | black |
| 12 | zeolite | Cu—B | C | B | black |
| 13 | Ca-silicate | Ti—W | C | B | black |
| 14 | Ca-silicate | Ti—Y | C | B | black |
| 15 | Ca-silicate | Fe—O | B | A | black |
| 16 | Ca-silicate | Cu—B | C | B | black |

EXAMPLE 8

The ingredients shown in Table 9 below were blended in the amounts shown in Table 9 to obtain compositions of Sample Nos. 1–8. In Table 9, the amounts are parts by weight and abbreviations and trademarks are as follows:

EPIKOTE 828: Bisphenol A epoxy resin manufactured by Yuka-Shell Epoxy Inc.

EPIKOTE 1002: Bisphenol A epoxy resin manufactured by Yuka-Shell Epoxy Inc.

Anhydride A: Methyltetrahydrophthalic anhydride

Anhydride B: Benzophenone tetracarbolylic anhydride

Phenol Resin: Phenol novolak resin (Tamanol 754, hydroxyl equivalent: 104, manufactured by Arakawa Chemical Industry Inc.)

TPP: Triphenylphosphine

Silica: Amorphous silica Micron S-COL (manufactured by Micron Inc., average particle size: 28 μm)

Fe-0: Colorant (Example 1)

Cordierite: LB absorber (Example 1)

CoA-Fe-O: Composite particles obtained in Example 2

CoD-Fe-O: Composite particles obtained by the wet-mixing method (Method D shown in Example 6 using Fe-O (1part) as a colorant and cordierite (9 parts) as an LB absorber, average particle diameter: 12 μm)

Each of Samples Nos. 1–8 was applied on a surface of an aluminum plate (50 mm×50 mm×1.5 mm) and the coating was heated at 120° C. to form a cured resin layer (thickness: 0.5 mm) thereon. Bar mark (line width: 0.2 mm) was then marked on the coated resin layer by irradiation with a laser beam ($CO_2$ laser, wavelength: 10.6 μm, energy: 4 $J/cm^2$) using a commercially available laser beam marking device (TEA Unimark 400-4J, manufactured by Ushio Electric Co., Ltd.). The color of the mark and the visibility were as summarized in Table 9.

EXAMPLE 10

Example 8 was repeated in the same manner as described except that CoA-T-W (obtained in Example 2), CoB-T-W (obtained in Example 3), CoC-Ti-Y (obtained in Example 6) or CoD-Ti-W (obtained in Example 6) was used as the composite particles. The results are summarized in Table 11. Comparative samples gave gray marks while the samples according to the present invention gave black or grayish black marks.

EXAMPLE 11

Example 8 was repeated in the same manner as described except that CoA-T-W, ZeA-Ti-W, ZrA-Ti-W, CaA-Ti-W or CoA-Nb-W (obtained in Example 4) was used as the composite particles. The results are summarized in Table 12. Comparative samples Nos. 1, 3, 5, 7 and 9 gave gray marks while the samples Nos. 2, 6 and 11 according to the present invention gave black marks. The samples Nos. 4, 8 and 10 of the present invention gave grayish black marks.

EXAMPLE 12

Example 8 was repeated in the same manner as described except that CoB-T-W, ZeB-Ti-W, ZrB-Ti-W, CaB-Ti-W or CoB-Nb-W (obtained in Example 5) was used as the composite particles. The results are summarized in Table 13. Comparative samples Nos. 1, 3, 5, 7 and 9 gave gray marks while the samples Nos. 2, 6, 10 and 11 according to the present invention gave black marks. The samples Nos. 4 and 8 of the present invention gave gray marks. In Tables 10–13, the symbol "*" indicates comparative sample.

TABLE 9

| Sample No. | 1* | 2 | 3 | 4* | 5 | 6 | 7 | 8 |
|---|---|---|---|---|---|---|---|---|
| Resin composition | | | | | | | | |
| EPIKOTE 828 | 100 | 100 | 100 | 100 | 100 | 100 | | |
| EPIKOTE 1002 | | | | | | | 100 | 100 |
| Anhydride A | 87 | 87 | 87 | 87 | 87 | 87 | | |
| Anhydride B | | | | | | | 20 | |
| Phenol Resin | | | | | | | | 15 |
| BDMA | 1.5 | 1.5 | 1.5 | 1.5 | 1.5 | 1.5 | | |
| TPP | | | | | | | 1.0 | 1.0 |
| Filler | | | | | | | | |
| Silica | 80 | 80 | 80 | 80 | 80 | 80 | | |
| Fe—O | 2 | | | 1 | | | | |
| Cordierite | 18 | | | 19 | | | | |
| Composite particles | | | | | | | | |
| CoA—Fe—O | | 20 | | | 10 | | 20 | 20 |
| CoD—Fe—O | | | 20 | | | 10 | | |
| Color of Mark | brown | black | black | red | brown | brown | black | black |
| Visibility | | | | | | | | |
| Once | C | B | B | D | C | C | B | B |
| Five times | B | A | A | D | B | B | A | A |

*Comparative sample

EXAMPLE 9

Example 8 was repeated in the same manner as described except that CoB-T-W, CoB-Ti-Y or CoB-Nb-W (obtained in Example 3) was used as the composite particles. The results are summarized in Table 10.

TABLE 10

| Sample No. | 1* | 2 | 3* | 4 | 5* | 6 | 7 |
|---|---|---|---|---|---|---|---|
| Resin composition | | | | | | | |
| EPIKOTE 828 | 100 | 100 | 100 | 100 | 100 | 100 | |
| EPIKOTE 1002 | | | | | | | 100 |
| Anhydride A | 87 | 87 | 87 | 87 | 87 | 87 | |
| Anhydride B | | | | | | | 20 |
| BDMA | 1.5 | 1.5 | 1.5 | 1.5 | 1.5 | 1.5 | |
| TPP | | | | | | | 1.0 |
| Filler | | | | | | | |
| Silica | 80 | 80 | 80 | 80 | 80 | 80 | 80 |
| Ti—W | 2 | | | | | | |
| Ti—Y | | | 2 | | | | |
| Nb—W | | | | | 2 | | |
| Cordierite | 18 | | 18 | | 18 | | |
| Composite particles | | | | | | | |
| CoB—Ti—W | | 20 | | | | | 20 |
| CoB—Ti—Y | | | | 20 | | | |
| CoB—Nb—O | | | | | | 20 | |
| Color of Mark | gray | black | gray | black | gray | gray-black | black |
| Visibility | | | | | | | |
| Once | D | B | D | B | D | C | B |
| Five times | C | A | C | A | C | B | A |

*Comparative sample

TABLE 11

| Sample No. | 1* | 2 | 3 | 4 | 5 | 6* | 7 | 8 | 9 | 10 | 11 | 12 |
|---|---|---|---|---|---|---|---|---|---|---|---|---|
| Resin composition | | | | | | | | | | | | |
| EPIKOTE 828 | 100 | 100 | 100 | 100 | 100 | 100 | 100 | 100 | 100 | 100 | | |
| EPIKOTE 1002 | | | | | | | | | | | 100 | 100 |
| Anhydride A | 87 | 87 | 87 | 87 | 87 | 87 | 87 | 87 | 87 | 87 | | |
| Anhydride B | | | | | | | | | | | 20 | |
| Phenol resin | | | | | | | | | | | | 15 |
| BDMA | 1.5 | 1.5 | 1.5 | 1.5 | 1.5 | 1.5 | 1.5 | 1.5 | 1.5 | 1.5 | | |
| TPP | | | | | | | | | | | 1.0 | 1.0 |
| Filler | | | | | | | | | | | | |
| Silica | 80 | 80 | 80 | 80 | 80 | 80 | 80 | 80 | 80 | 80 | 50 | 50 |
| Ti—W | 5 | | | | | 2 | | | | | | |
| Cordierite | 45 | | | | | 18 | | | | | | |
| Composite particles | | | | | | | | | | | | |
| CoA—Ti—W | | 50 | | | | | 20 | | | | | |
| CoB—Ti—W | | | | 50 | | | | | | 20 | 50 | 50 |
| CoC—Ti—W | | | | 50 | | | | | 20 | | | |
| CoD—Ti—W | | 50 | | | | | | 20 | | | | |
| Visibility | | | | | | | | | | | | |
| Once | C | C | C | B | B | D | C | C | C | B | B | B |
| Five times | B | A | B | A | A | C | B | B | B | A | A | A |

TABLE 12

| Sample No. | 1* | 2 | 3* | 4 | 5* | 6 | 7* | 8 | 9* | 10 | 11 |
|---|---|---|---|---|---|---|---|---|---|---|---|
| Resin composition | | | | | | | | | | | |
| EPIKOTE 828 | 100 | 100 | 100 | 100 | 100 | 100 | 100 | 100 | 100 | 100 | |
| EPIKOTE 1002 | | | | | | | | | | | 100 |
| Anhydride A | 87 | 87 | 87 | 87 | 87 | 87 | 87 | 87 | 87 | 87 | |
| Anhydride B | | | | | | | | | | | 20 |

TABLE 12-continued

| Sample No. | 1* | 2 | 3* | 4 | 5* | 6 | 7* | 8 | 9* | 10 | 11 |
|---|---|---|---|---|---|---|---|---|---|---|---|
| BDMA | 1.5 | 1.5 | 1.5 | 1.5 | 1.5 | 1.5 | 1.5 | 1.5 | 1.5 | 1.5 | |
| TPP | | | | | | | | | | | 1.0 |
| Filler | | | | | | | | | | | |
| Silica | 80 | 80 | 80 | 80 | 80 | 80 | 80 | 80 | 80 | 80 | 80 |
| Ti—W | 2 | | 2 | | 2 | | 2 | | | | |
| Nb—O | | | | | | | | | 2 | | |
| Cordierite | 18 | | | | | | | | 18 | | |
| Zeolite | | | 18 | | | | | | | | |
| Zr-silicate | | | | | 18 | | | | | | |
| Ca-silicate | | | | | | | | 18 | | | |
| Composite particles | | | | | | | | | | | |
| CoA—Ti—W | | 20 | | | | | | | | | 20 |
| ZeA—Ti—W | | | | 20 | | | | | | | |
| ZrA—Ti—W | | | | | | 20 | | | | | |
| CaA—Ti—W | | | | | | | | 20 | | | |
| CoA—Nb—O | | | | | | | | | | 20 | |
| Visibility | | | | | | | | | | | |
| Once | D | C | D | C | D | C | D | C | D | C | C |
| Five times | C | B | C | B | C | B | C | B | C | B | B |

TABLE 13

| Sample No. | 1* | 2 | 3* | 4 | 5* | 6 | 7* | 8 | 9* | 10 | 11 |
|---|---|---|---|---|---|---|---|---|---|---|---|
| Resin composition | | | | | | | | | | | |
| EPIKOTE 828 | 100 | 100 | 100 | 100 | 100 | 100 | 100 | 100 | 100 | 100 | |
| EPIKOTE 1002 | | | | | | | | | | | 100 |
| Anhydride A | 87 | 87 | 87 | 87 | 87 | 87 | 87 | 87 | 87 | 87 | |
| Anhydride B | | | | | | | | | | | 20 |
| BDMA | 1.5 | 1.5 | 1.5 | 1.5 | 1.5 | 1.5 | 1.5 | 1.5 | 1.5 | 1.5 | |
| TPP | | | | | | | | | | | 1.0 |
| Filler | | | | | | | | | | | |
| Silica | 80 | 80 | 80 | 80 | 80 | 80 | 80 | 80 | 80 | 80 | 80 |
| Ti—W | 2 | | 2 | | 2 | | 2 | | | | |
| Nb—O | | | | | | | | | 2 | | |
| Cordierite | 18 | | | | | | | | 18 | | |
| Zeolite | | | 18 | | | | | | | | |
| Zr-silicate | | | | | 18 | | | | | | |
| Ca-silicate | | | | | | | | 18 | | | |
| Composite particles | | | | | | | | | | | |
| CoA—Ti—W | | 20 | | | | | | | | | 20 |
| ZeA—Ti—W | | | | 20 | | | | | | | |
| ZrA—Ti—W | | | | | | 20 | | | | | |
| CaA—Ti—W | | | | | | | | 20 | | | |
| CoA—Nb—O | | | | | | | | | | 20 | |
| Visibility | | | | | | | | | | | |
| Once | D | B | D | C | D | B | D | C | D | C | B |
| Five times | C | A | C | B | C | A | C | B | C | B | A |

EXAMPLE 13

Preparation of Composite Particles by Dry-Mixing Method (Method A):

In accordance with the Method A described in Example 1, cupric oxalate and cordierite were processed to obtain composite particles CoA-Cu-1 having an average particle diameter of 10 μm and a weight ratio of cupric oxalate to cordierite of 3:17 and CoA-Cu-2 having an average particle diameter of 15 μm and a weight ratio of cupric oxalate to cordierite of 3:7.

Preparation of Composite Particles by Precipitation Method:

Into a three-necked flask were charged 34 g of cordierite (the same as used in Example 1) and 100 ml of water and the mixture was heated to 50° C. With stirring, a solution of anhydrous cupric sulfate (5.8 g) dissolved in 60 ml of water was poured dropwise into the flask. Then, a solution of oxalic acid dihydride (7.2 g) dissolved in 50 ml of distilled water was added dropwise to the mixture in the flask with stirring. The resulting mixture was stirred for 30 minutes and a greater part of the water was removed in vacuo. The remaining mixture was filtered and the solids phase was dried at 110° C., thereby to obtain composite particles CoC-Cu-1 having an average particle diameter of 15 μm and a weight ratio of cupric oxalate to cordierite of 3:17.

The above procedure was repeated in the same manner as described except that the amounts of the cordierite, anhydrous cupric sulfate and oxalic acid dihydrate were changed to 14 g, 5.8 g and 7.2 g, respectively, thereby to obtain composite particles CoC-Cu-2 having an average particle diameter of 10 μm and a weight ratio of cupric oxalate to cordierite of 3:7.

Using the thus obtained composite particles, Example 8 was repeated in the same manner as described. The results are shown in Table 14.

TABLE 14

| Sample No. | 1* | 2 | 3 | 4* | 5 | 6 |
|---|---|---|---|---|---|---|
| Resin composition | | | | | | |
| EPIKOTE 828 | 100 | 100 | 100 | 100 | 100 | 100 |
| Anhydride A | 87 | 87 | 87 | 87 | 87 | 87 |
| BDMA | 1.5 | 1.5 | 1.5 | 1.5 | 1.5 | 1.5 |
| Silica | 50 | 50 | 50 | 50 | 50 | 50 |
| Cu oxalate | 7.5 | | | 15 | | |
| Cordierite | 42.5 | | | 35 | | |
| CoA—Cu-1 | | 50 | | | | |
| CoA—Cu-2 | | | | | 50 | |
| CoC—Cu-1 | | | 50 | | | |
| CoC—Cu-2 | | | | | | 50 |
| Color of Mark | — | gray | gray-black | gray | gray-black | black |
| Visibility | | | | | | |
| Once | D | C | B | D | B | B |
| Five times | D | B | B | C | B | A |

*Comparative sample

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all the changes which come within the meaning and range of equivalency of the claims are therefore intended to be embraced therein.

What is claimed is:

1. A particulate coloring material comprising composite particles which have an average particle diameter of 0.1–50 μm and each of which is composed of (a) a particulate, laser beam absorbing inorganic substance selected from the group consisting of cordierite, zeolite, zirconium silicate and calcium silicate and (b) a colorant physically bonded directly to said inorganic substance and capable of discoloring upon being heated at a temperature of 250° C. or more, the weight ratio of said colorant to said inorganic substance being in the range of 1:99 to 50:50.

2. A material according to claim 1, wherein said composite particles are obtained by a method including sintering a blend of said inorganic substance with said colorant to obtain a sintered mass, and pulverizing said sintered mass.

3. A material according to claim 2, wherein said colorant is $Nb_2O_5$, $TiO_2(IV)$ and titanium yellow.

* * * * *

UNITED STATES PATENT AND TRADEMARK OFFICE
CERTIFICATE OF CORRECTION

PATENT NO. : 5,578,120
DATED      : November 26, 1996
INVENTOR(S) : TAKAHASHI et al It is certified that error appears in the above-indentified patent and that said Letters Patent is hereby corrected as shown below:

Col. 5, line 65, "bee" should read --beam--.
Col. 9, Table 5, Col. "10", line 13 of the table ("CoA-Ti-W"), "10" should be under Col. "11".
Col. 13, line 15, "Fe-0" should read --Fe-O--.

Signed and Sealed this

Fifth Day of August, 1997

Attest:

BRUCE LEHMAN

Attesting Officer

Commissioner of Patents and Trademarks